United States Patent [19]

Taguchi et al.

[11] 3,896,462

[45] July 22, 1975

[54] EXPOSURE VALUE CORRECTING DEVICE IN AN INTERCHANGEABLE LENS CAMERA PROVIDED WITH A TTL EXPOSURE METER

[75] Inventors: Tatsuya Taguchi, Tokyo; Yukio Iura, Yokosuka, both of Japan

[73] Assignee: Canon Kabushiki Kaisha, Tokyo, Japan

[22] Filed: Aug. 24, 1973

[21] Appl. No.: 391,343

[30] Foreign Application Priority Data

Sept. 1, 1972   Japan............................ 47-102576

[52] U.S. Cl................................. 354/46; 354/272
[51] Int. Cl. ............................................. G03b 7/20
[58] Field of Search .......... 95/64 R, 64 B, 10 C, 42; 354/46, 272, 273

[56] References Cited
UNITED STATES PATENTS

| | | |
|---|---|---|
| 3,082,672 | 3/1963 | Swarofsky et al.................... 354/46 |
| 3,194,135 | 7/1965 | Haiter et al............................ 354/46 |
| 3,485,153 | 12/1969 | Ono et al. ............................ 95/10 C |
| 3,598,036 | 8/1971 | Suzuki.............................. 95/10 C X |
| 3,608,450 | 9/1971 | Shimomura........................ 95/10 C |
| 3,683,765 | 8/1972 | Iura..................................... 95/10 C |
| 3,747,485 | 7/1973 | Suzuki................................. 95/64 B |

*Primary Examiner*—Samuel S. Matthews
*Assistant Examiner*—E. M. O'Connor
*Attorney, Agent, or Firm*—William R. Woodward

[57] ABSTRACT

In a single-lens reflex camera of the TTL metering type, light passed from an object to be photographed through the open aperture in a photographic lens is measured and a correction member provided in the interchangeable photographic lens automatically corrects a vignetting error produced during the TTL metering while shifting the scale plate mounted within the viewfinder for indicating the maximum relative aperture of the lens, whereby the indication of the initial aperture value of the lens and the correction of the metering error are performed simultaneously upon mounting of the interchangeable lens.

5 Claims, 6 Drawing Figures

EXPOSURE VALUE CORRECTING DEVICE IN AN INTERCHANGEABLE LENS CAMERA PROVIDED WITH A TTL EXPOSURE METER

BACKGROUND OF THE INVENTION

1. Field of the Invention

This invention relates to an exposure value correcting device in an interchangeable lens camera provided with a through-the lens (TTL) exposure meter, and more particularly to such an exposure correcting device in which a reduction, caused by vignetting, in the quantity of light measured through a lens of large relative aperture during the TTL metering is corrected for the mounted lens while the maximum aperture value of the lens is automatically indicated in the viewfinder of the camera.

Description of the Prior Art

In a TTL exposure meter, the quantity of light received by the photosensitive element is generally proportional to the area of the open aperture in the lens. However, where the lens is of great relative aperture, the quantity of marginal light is reduced by optical limitations such as the presence of the lens tube, and effect known as "vignetting", and the aforesaid relation of proportionality is not completely satisfied during the TTL metering.

FIG. 1 of the accompanying drawings graphically illustrates the above-described effect in terms of lens F-number and the angle of deviation of the meter corresponding to the intensity of illumination on the surface of the light sensing element. It is seen that the proportional relation between the two factors is satisfied for F-numbers down to F2.8, but a metering error or index error sets in at about F2 and has a considerable value $\theta$ for F-numbers below F1.6. Accordingly, when metering is effected with the above-described type of camera at an open aperture of F1.4, there is evidently an exposure error in fully open aperture photography and moreover, when the preset control ring is adjusted to cause, for example, a meter follower needle associated therewith to be registered with a meter needle to thereby effect photography at a small aperture less than $f/1.4$, where $f$ is the focal length and the denominator is the F number the resultant exposure will again present an error as a result of the relation as indicated by the broken line in the graph, which indicates the F numbers readings of the meter as a result of failure to correct the error $\theta$.

However, lenses having smaller aperture, with F numbers of 3.5 or higher, are free of such metering error and the need for the correction is eliminated in case of these lenses.

SUMMARY OF THE INVENTION

The present invention intends to provide, in an interchangeable lens camera, an exposure value correcting device which, when a lens of F number lower than a predetermined value, such as 2.8, aperture value is employed, corrects any metering error produced by vignetting whereas when a lens of maximum aperture small enough to be free of vignetting error is employed, no such correction is made. In both cases, however, an indication of the F number for the maximum value of the lens is displayed at the head of the aperture scale within the viewfinder, as by a shift of the scale. It is an object of the invention to accomplish metering correction by a single correction member provided in the lens.

The invention will become more fully apparent from the following detailed description taken in conjunction with the accompanying drawings.

DESCRIPTION OF THE PREFERRED EMBODIMENTS

Figure 1:
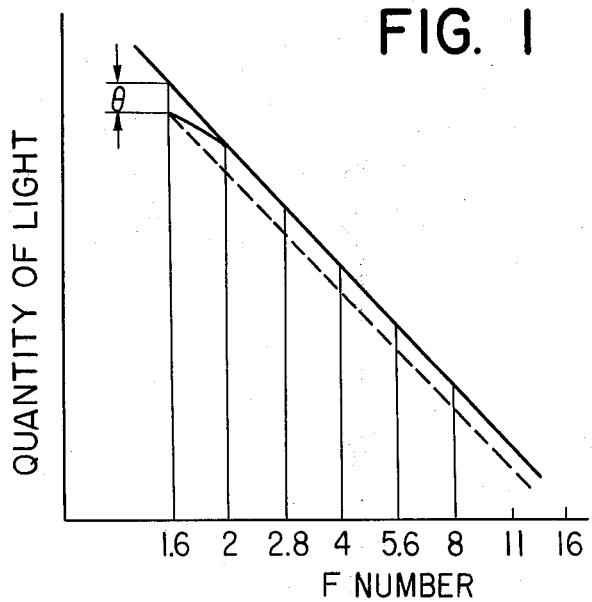
FIG. 1 is a graph illustrating the relation in a TTL exposure meter between the lens F-number and the angle of deviation of the meter corresponding to the quantity of light received by the meter.
Figure 2:
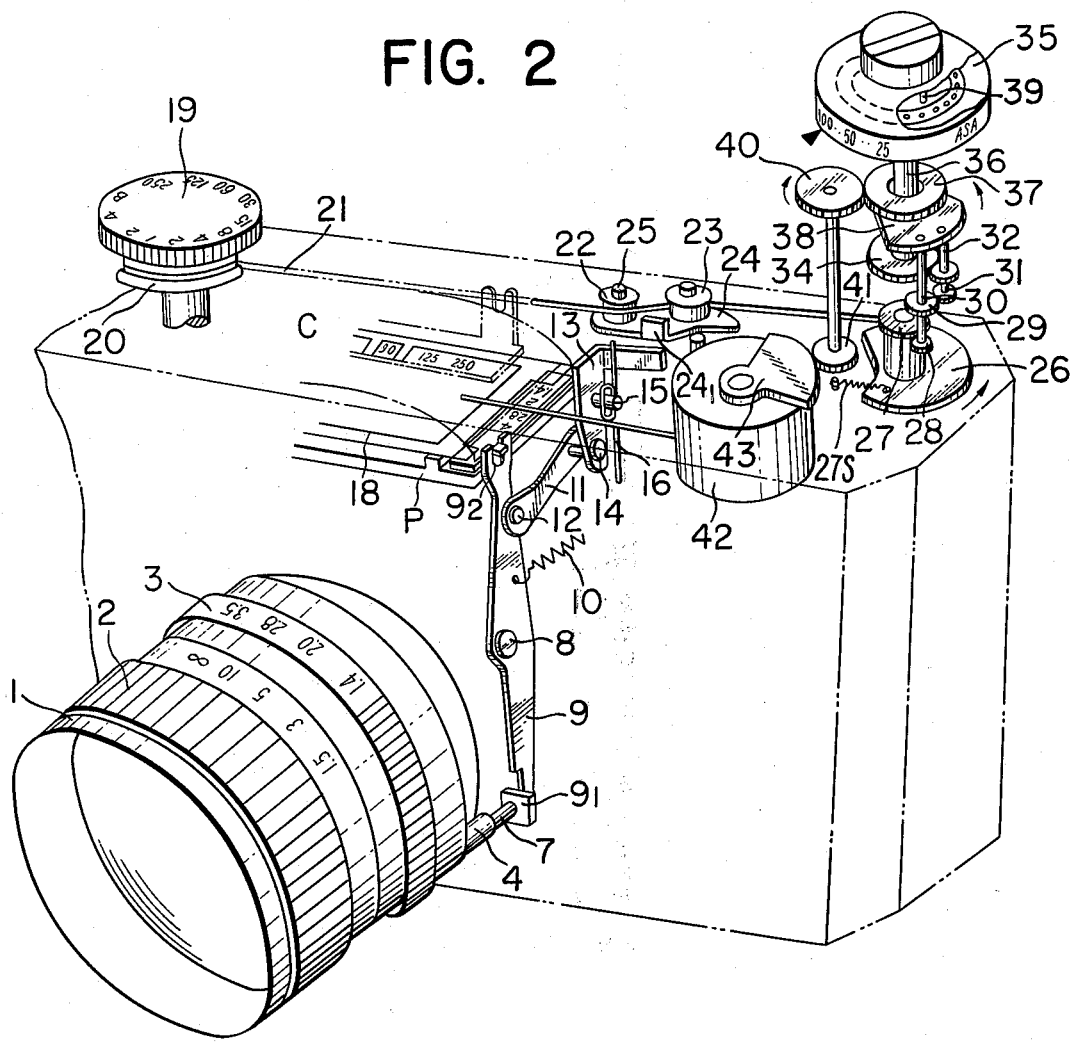
FIG. 2 is a perspective view schematically showing the construction of a camera incorporating therein the correcting device according to the present invention.

Referring to FIG. 2, there is seen an interchangeable lens 1, a lens distance control ring 2, a preset aperture control ring 3 for the lens 1, and a correction member 4 studded in the back side of the lens 1. The correction member 4 for the lens 1, as is particularly shown in FIG. 3, may have an axial length variable in accordance with the maximum aperture value of the lens: for example, the correction member for a lens of F2.8 has a length $\alpha$, whereas the correction member for a lens of F1.4 has a length $\alpha + \Delta\alpha$ to correct the error $\theta$ as indicated in FIG. 1, and the correction member for a lens of F5.6 has a length $\alpha - \Delta\alpha$.

Figure 3:
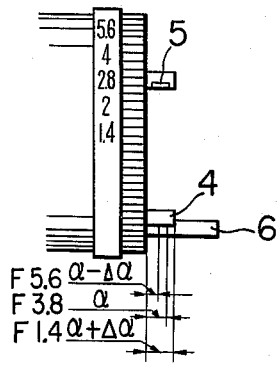
FIG. 3 is a rear view of a lens used with the device of FIG. 2.
Figure 4:
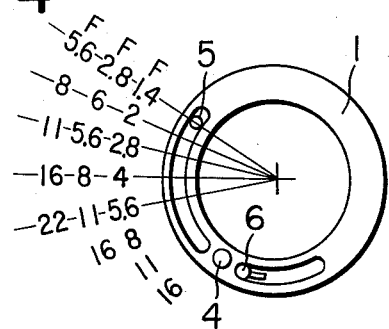
FIG. 4 is a side view of the lens used with the device of FIG. 2.

A preset pin 5 is also provided in the back side of the lens 1 shown in FIG. 3 and may be displaced circumferentially of the lens with rotation of the preset ring 3, and a driven pin 6 is further provided which may be driven by an automatic aperture drive lever of the camera to stop down an unshown aperture device to an aperture value as preset by the preset ring 3. As seen in FIG. 4, the interchangeable lenses usable with the present invention are such that the preset pin 5 thereof is positioned at the same point regardless of the different maximum aperture values of the lenses when they are set to their respective maximum aperture values.

Turning back to FIG. 2, an engaging pin 7 engageable with the correction member 4 upon mounting of the lens to the camera is studded in a bent portion $9_1$ forming one end of an engaging lever 9 pivotally supported by a pivot 8 on the fixed frame in the camera. A spring 10 is provided to bias the lever 9 in clockwise direction. A link lever 11 is pivotally supported by a pin 12 on the lever 9 at the other end thereof. A transmission lever 13 is pivotally linked to the other end of the link lever 11 by means of a pin 14 studded therein. The transmission lever 13 is pivotally supported by a pin 15 on the fixed frame of the camera and biased for clockwise rotation by a spring 16. The other end of the lever 9 is formed into a fork-like shape and engaged with an aperture scale plate 17, which is slidably displaceable on a focusing surface formed as a depression in one side edge of a focusing plate P, and thus the lever 9 holds the aperture scale plate for free displacement. A viewfinder frame 18 is interposed between the focusing plate P and a condenser lens C. There is further seen a shutter speed control dial 19, a pulley 20 formed integrally and coaxially with the stem of the dial 19, a connector wire 21 wound around the pulley 20 and having one end secured thereto, and guide rollers 22 and 23 rotatably mounted on a correction lever 24. The correction lever 24 is pivotable about a pivot 25 secured to the fixed frame and has a bent portion $24_1$ engageably opposed to the bent portion B of the transmission lever 13. A take-up pulley 26 is provided for the connector wire 21 and biased by a spring 27S to impart a tension to the wire 21. A gear 27 is mounted coaxially with the pulley 26 and in mesh engagement with a reduction gear 28, and a gear 29 mounted on the shaft 30 rotatable with the gear 28 is in mesh engagement with a reduction gear 31. The gear 31 is floatably mounted on a shaft 32 and formed integrally with a gear 33, which in turn is meshing with a gear 34. The gear 34 is securely mounted on a rotatable shaft 36 formed integrally and coaxially with an ASA set dial 35. A floating gear 37 is mounted coaxially on the shaft 36.

A holder plate 38 is formed integrally with the underside of the gear 37 and has studded pins 30 and 32 thereon. Rotation of the ASA set dial 35 will cause the gear 34 to be rotated until a pin 39 is received in a predetermined click to stop the rotation of the dial 35, whereby the rotational force may be transmitted through the gears 33, 31, 29, 28 but since the gear 27 on the pulley 26 is then stationary, the gear 28 planetates around the gear 27 and rotates the gear 37 through the agency of the holder plate 38. There are further provided driven gears 40 and 41, exposure meter 42, and gear 43 secured to the body of the meter 42. When the ASA dial 35 is rotated to set it to a desired ASA value in the manner described above, the meter 42 may be rotated through the agency of the reduction gear train 27-41 to thereby set the ASA information mechanically. Also, rotation of the shutter dial 19 will cause rotation of the pulley 20, which in turn will drive the pulley 26 by means of the wire 21, thereby rotating the body of the meter 42 through the gears 27, 28, 29, 31, 33, 37, 40, 41 to set the shutter information.

Figure 5:
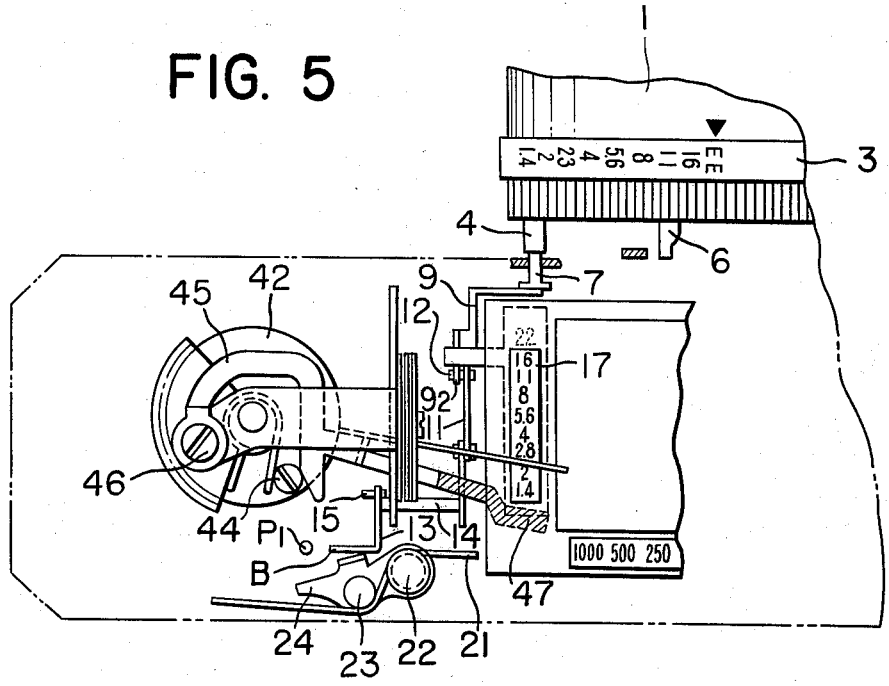
FIGS. 5 and 6 illustrate the operation of the FIG. 2 device.

With the above-described construction, an interchangeable lens of F1.4 may be mounted in the manner as shown in FIG. 5. The correction member 4 of the lens 1 displaces the arm 9 by means of the engaging pin 7, which in turn shifts the scale plate 17 so that the F number 1.4 corresponding to the maximum aperture of the lens is moved to one end of the viewfinder frame 18. At the same time, the transmission lever 13 causes rotation of the correction lever 24 which imparts a bend to the wire 21 to thereby rotate the pulley 26. Thus, the body of the meter 42 is rotated by means of the reduction gear train to correct the vignetting error $\theta$ in the quantity of light which is produced for the maximum relative aperture of the lens during the TTL metering. It will thus be seen that although the scale 17 has been shifted to show the actual maximum aperture $f/1.4$, a vignetting correction corresponding to that maximum aperture has been effected by rotation of the meter 42. In other words, the dimension $\Delta\alpha$ on correcting pin 4 of the lens shown in FIG. 3 takes account only of the maximum aperture of the lens.

The needle in the meter 42 is displaced by the output which an unshown light receiving element produces for the corrected maximum aperture value. Subsequently, the shutter dial 19 and the ASA dial 35 are adjusted to further rotate the body of the meter 42, and as a result, the proper aperture value of the lens of the maximum aperture value so mounted is indicated on the scale plate 17 by the meter needle. In FIG. 5, the needle points to approximately 2.8, and this means that a proper exposure can be provided for photography by setting the preset ring to the division 2.8.

When the meter needle points to below F1.4 on the scale 17, the shutter dial 19 or the ASA dial 35 may be readjusted to shift the meter needle back into the limit of the scale. However, where the object to be photographed is of low brightness or dark, the meter needle may fail to be displaced upon such adjustment. In that case, rotation of the meter body produced by the adjustment causes a pin 44 provided thereon to actuate a portion of an alarm arm 45 pivotally mounted on a pivot 46 located eccentrically on the meter 42, whereby a red marking member 47 secured to one end of the alarm arm 45 is shifted onto the scale plate within the viewfinder, thus providing an alarm that an improper exposure indication is taking place.

Figure 6:
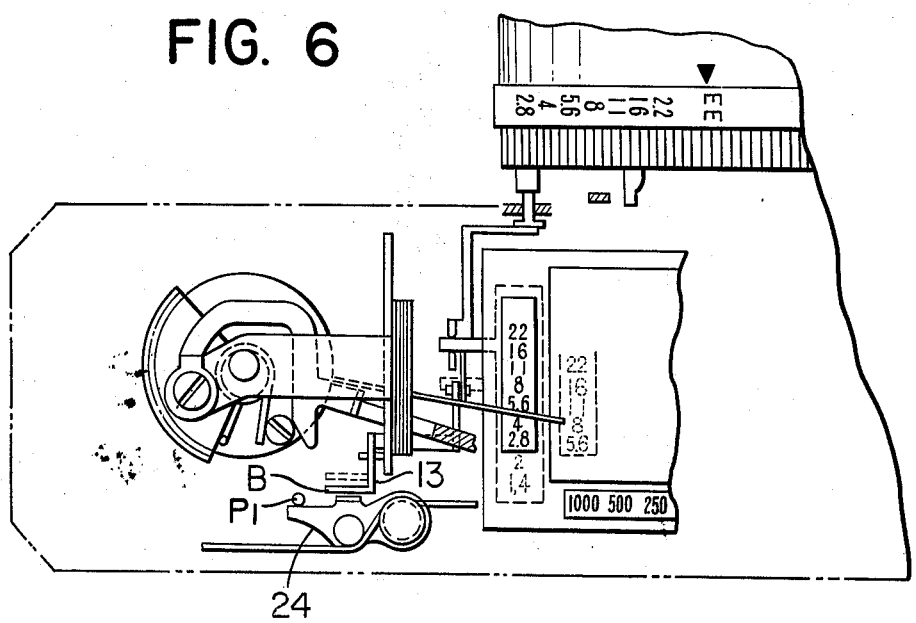

When a lens of maximum aperture of F number 2.8 is mounted, the displacement of the correction lever 24 is reduced as shown in FIG. 6, that is, the lever 24 is shifted substantially to a position where a portion thereof is engaged with a stop pin P1. This is because the vignetting decrement in the quantity of light during the TTL metering is negligible for the F2.8 lens and no shift of the correction lever 24 from the pin P1 is needed. However, the scale plate 17 is displaced to indicate the maximum lens aperture value 2.8 at the end of the viewfinder frame 18.

In case where a lens of maximum aperture of F number 5.6 is mounted, the transmission lever is shifted to the broken-line position by the correction member 4 as shown in FIG. 6, with the correction lever stopped by the pin P1 and maintained at a predetermined distance from the transmission lever, thus imparting no correction to the meter 42. However, the scale plate 17 is shifted by the correction member 4 to indicate the maximum lens aperture value at the end of the viewfinder frame 18, as shown by the broken line in FIG. 6.

Thus, according to the present invention, where the lens is of an aperture value which requires vignetting error from the TTL metering to be corrected, such error is corrected at the same time that the indicator scale plate is shifted, but where the lens is of the type which does not require said correction, only the shift of the indicator scale plate takes place and these effects can be achieved simply by a single correction member on the interchangeable lens, to a great practical advantage.

While the invention has been described with respect to an embodiment in which an F number on the scale plate is read to set the preset ring, it will be apparent that in case of cameras having incorporated a known EE mechanism, the meter needle may be detected to automatically displace the pin 5 operatively associated with the preset ring to thereby permit manual control of the preset ring to be achieved automatically.

The F number is inversely proportional to the aperture area, being the ratio of the focal length $f$ to the aperture area A, therefore:

$f/A = F$ number and also $f/F$ number $= A$.

The reciprocal of the F number is sometimes known as the "relative aperture value", and thus for an F number of 2 the "relative aperture" is 1:2. In general the term "aperture value" is used herein to mean a value really signifying its reciprocal expressed in the usual way with an F number/ but wherever apertures or aperture values are compared as to size herein, it is important to be clear whether the aperture magnitude or the F number magnitude is meant. The expression "relative aperture scale" means an aperture scale normalized with respect to focal length, hence most commonly graduated in F numbers.

We claim:

1. A camera equipped with an interchangeable lens and arranged for viewfinding and photometry at maximum lens aperture, comprising:
   an aperture preset control means on said lens coupled with said camera;
   an indicating member on said lens having a dimension indicative of the maximum value of the relative aperture of said lens;
   a viewfinder;
   a through-the-lens photometry system including a meter having a meter body and a pointer and also including means responsive to light received through said lens for actuating the meter in accordance with light quantity so received, the position of said pointer being visible in said viewfinder;
   displaceable relative aperture scale means mounted in said viewfinder for indicating with reference to said pointer an aperture preset value to be used;
   means responsive to said dimension of said indicating member of said lens for shifting said scale means so that the scale division thereof corresponding to the maximum relative aperture of the lens is at a predetermined position in the camera;
   means responsive to the extent of displacement of said scale shifting means beyond a predetermined displacement thereof for applying to said photometry system a correction for the vignetting effect that occurs in lenses having a maximum relative aperture value greater than a a predetermined value.

2. A camera according to claim 1, wherein said through-the-lens photometry system includes:
   a plurality of exposure factor determination means;
   wire means interconnecting said plurality of exposure factor determination means and said meter body for rotating said meter body and for causing said meter pointer to indicate on said scale means an at least approximately correct aperture preset value;
   and wherein said means for applying a correction to said photometry system comprises pivotable means having a portion engageable with said wire means such as to displace the path of said wire means by pivotable movement and thereby to contribute to the rotation of said meter body in response to displacement of said scale shifting means beyond said predetermined displacement thereof.

3. A camera according to claim 2 in which said pivotable means is provided with stop means for limiting the responsiveness of said pivotable means to displacement of said scale shifting means to amounts of displacement in excess of said predetermined displacement of said scale shifting means.

4. A camera according to claim 1, wherein said scale shifting means includes:
   a pivotable member mounted for pivotal movement, said pivotable member being arranged so that one end thereof is engageable with said maximum aperture indicating member of said interchangeable lens and the other end is engaged with said scale means;
   and wherein said means for applying a correction to said photometry system includes link means linked to said pivotable member.

5. A camera according to claim 4, wherein said scale means includes:
   a flat plate provided adjacent to a focusing surface of said viewfinder, said flat plate having a guide projection formed in one side edge thereof; and
   an aperture value scale plate slidable along said projection and engaged with said pivotable member of said scale shifting means.

* * * * *